United States Patent [19]

Konishi

[11] Patent Number: 4,527,205
[45] Date of Patent: Jul. 2, 1985

[54] ELECTRONIC CAMERA SYSTEM

[75] Inventor: Masahiro Konishi, Saitama, Japan

[73] Assignee: Fuji Photo Film Company, Ltd., Asaka, Japan

[21] Appl. No.: 368,017

[22] Filed: Apr. 13, 1982

[30] Foreign Application Priority Data

Apr. 13, 1981 [JP] Japan .................. 56-55219

[51] Int. Cl.³ .............................................. H04N 5/76
[52] U.S. Cl. .................................. 360/35.1; 358/335; 358/906
[58] Field of Search ............... 358/906, 310, 335, 209, 358/213, 250, 254, 133; 360/33.1, 35.1

[56] References Cited

U.S. PATENT DOCUMENTS

| 3,833,758 | 9/1974 | Ferrari | 358/906 |
| 3,958,079 | 5/1976 | Case et al. | 358/209 |
| 3,962,725 | 6/1976 | Lemke et al. | 358/906 |
| 4,057,830 | 11/1977 | Adcock | 358/906 |
| 4,125,861 | 11/1978 | Mounts et al. | 358/133 |
| 4,131,919 | 12/1978 | Lloyd et al. | 358/906 |
| 4,420,773 | 12/1983 | Toyoda et al. | 358/335 |

FOREIGN PATENT DOCUMENTS 55-165077 12/1980 Japan .
56-4992 1/1981 Japan .................. 358/906

OTHER PUBLICATIONS

Miyaji et al., "Model CK-38, a New Color Camera for Electronic News Coverage", Toshiba Review, No. 103, May-Jun. 1976, pp. 21-26.

Primary Examiner—Donald McElheny, Jr.
Attorney, Agent, or Firm—Saidman, Sterne Kessler & Goldstein

[57] ABSTRACT

A camera head having an image pickup member, a taking lens system for forming an image of an object on the image pickup member and a shutter means is selectively mounted on a still camera body and a motion picture camera body. The still camera body includes a recording/controlling section adapted to record output signals from the image pickup member on a recording medium as a still picture, while the motion picture camera body includes a recording/controlling section adapted to record output signals from the image pickup member on a recording medium as a motion picture.

7 Claims, 2 Drawing Figures

ELECTRONIC CAMERA SYSTEM

BACKGROUND OF THE INVENTION

1. Field of the Invention

This invention relates to an electronic camera system in which image information obtained by an image pickup device is electrically processed to be recorded on a recording medium.

2. Description of the Prior Art

There has been developed an electronic still camera using an image pickup member which may be a solid state image pickup device formed of, e.g., charge-coupled devices (CCD), or an image pickup tube. Such a solid state image pickup device or an image pickup tube is also employed in a motion picture camera or a VTR camera. Accordingly, it is theoretically possible to use a single electronic camera both as a still camera and as a motion picture camera. However, in so doing, there are various difficulties as follows.

(1) In the case of a still, the quality of an image is required to be high, while in the case of a motion picture, the quality of the image need not be so high. Accordingly, in the case of an electronic still camera, a quantizer is required to be of large quantization bit number corresponding to the number of tone levels required to obtain an image of high quality, while in the case of an electronic motion picture camera, a quantizer having a relatively small quantization bit number can be used. Further, in the case of the electronic still camera, a great number of picture elements are required and therefore the amount of data for a frame becomes large. Thus, a recording/controlling section must be used which can process such a large amount of data.

(2) When taking still pictures, the shooting rate is no more than three to five frames a second. Therefore the read out speed from the image pickup member may be low. However, in the case of a motion picture, the shooting rate is generally as high as thirty frames a second. This requires a high read out speed from the pickup member.

(3) In an electronic camera, a magnetic recording medium such as a magnetic recording tape is used. When taking a still picture, the magnetic recording tape is caused to run intermittently, while when taking a motion picture, the magnetic recording tape is caused to run continuously.

(4) When taking a still picture, image signals may be simply serially read out from the image pickup device, while in the case of a motion picture, the image signals should be read out in an interlaced fashion or alternatively should be once stored in a buffer memory to be subsequently recorded in an interlaced fashion.

(5) In the case of a motion picture, the recording medium should be of a larger capacity, while in the case of a still picture the recording medium may be of a relatively small capacity.

As can be seen from the above description, it is very difficult to obtain an electronic camera having a recording/controlling section and a recording medium which can satisfy the various requirements for taking both still and motion pictures. Even should such an electronic camera be obtained, it would be very expensive and of very large size and weight, and would be quite inconvenient for practical use.

SUMMARY OF THE INVENTION

The primary object of the present invention is to provide an electronic camera system which is adapted for taking both still and motion pictures, and which is inexpensive and convenient for practical use.

The present invention accordingly provides an electronic camera system comprising a camera head having an image pickup member, a taking lens system for forming an image of an object to be taken on the image pickup member, and a shutter means; a camera body for taking a still picture having a recording/controlling section adapted to be connected to the image pickup member to record output signals therefrom on a recording medium as a still picture; and a camera body for taking a motion picture having a recording/controlling section adapted to be connected to the pickup member to record output signals therefrom on a recording medium as a motion picture, said camera head being able to be removably mounted either on the still picture camera body or on the motion picture camera body.

DESCRIPTION OF THE PREFERRED EMBODIMENT

Figure 1:
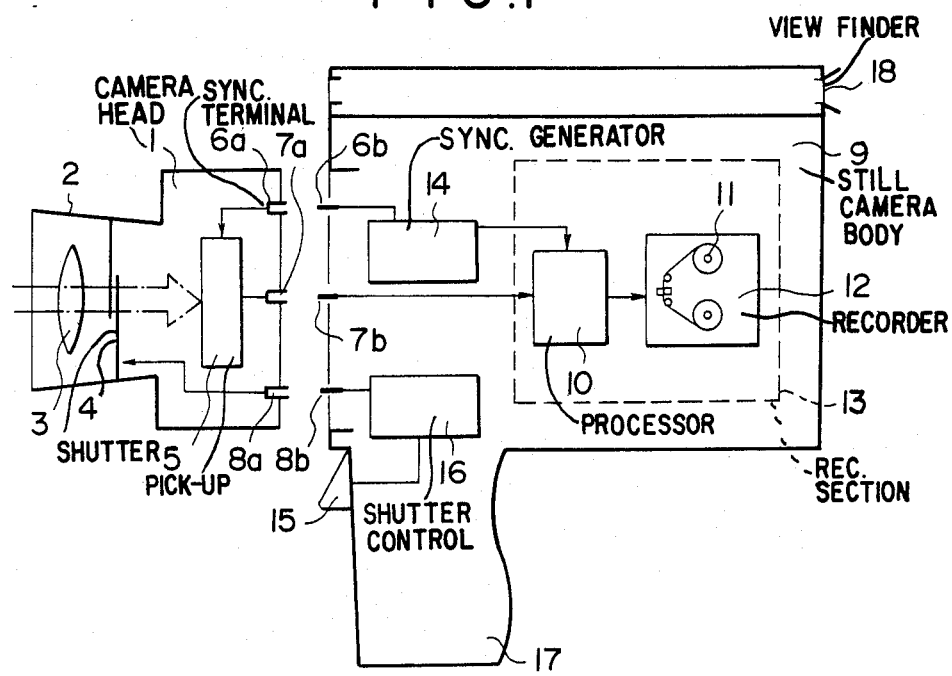
FIG. 1 is a schematic view illustrating a camera head and a camera body for taking a still picture which constitute an electronic camera system in accordance with an embodiment of the present invention.
Figure 2:
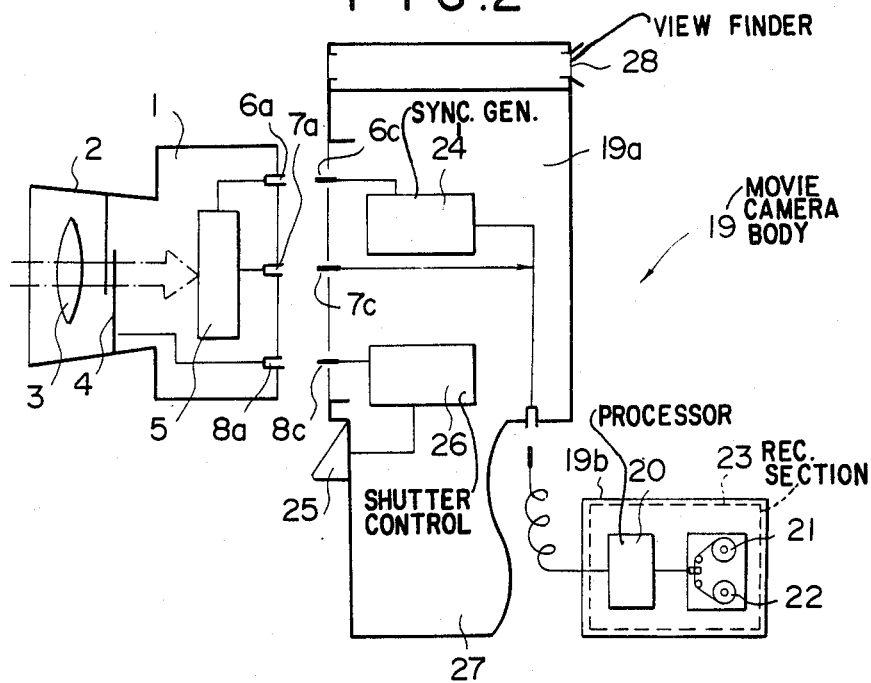
FIG. 2 is a schematic view illustrating the camera head of FIG. 1 with a camera body for taking a motion picture also constituting the electronic camera system of FIG. 1.

An electronic camera system in accordance with an embodiment of the present invention includes a camera head 1 which can be removably mounted either on a camera body 9 for taking a still picture as shown in FIG. 1 or on a camera body 19 for taking a motion picture as shown in FIG. 2.

The camera head 1 comprises a barrel 2 within which a taking lens system 3 and a shutter 4 are mounted. The taking lens system 3 and the shutter 4 may be of well known types employed in conventional optical photographic cameras. Behind the shutter 4 is disposed an image pickup member 5 in the focal plane of the taking lens system 3. The image pickup member 5 may be a solid state image pickup device comprising numbers of solid state image pickup elements arranged in rows and columns, each element having a photo-electric converting function and forming a picture element, or it may be an image pickup tub such as a vidicon. The camera head 1 further comprises electric terminals 6a, 7a and 8a which are respectively mated with terminals 6b, 7b and 8b on the still camera body 9 when the camera head 1 is mounted on the camera body 9 to establish electrical connections therebetween, or terminals 6c, 7c and 8c on the motion picture camera body 19 to establish electrical connections therebetween. The image pickup member 5 is controlled by way of the electrical connection between the terminals 6a and 6b, or 6a and 6c. Image signals are read out from the image pickup member 5 to the camera body 9 or 19 by way of the electrical connection between the terminals 7a and 7b, or 7a and 7c. The shutter 4 is driven by way of the electrical connection between terminals 8a and 8b, or 8a and 8c.

A recording section 13 is provided in the still camera body 9 (FIG. 1). Recording section 13 comprises a signal processing section 10 having an amplifier for amplifying the output signals from the image pickup member 5 in the camera head 1 and a quantizer for quantizing the amplified signals, and a recording device 12 for recording the output signals from the signal processing section 10 on a recording medium 11. The still camera body 9 is further provided with a synchronizing signal generator 14 which delivers synchronizing signals both to the image pickup member 5 and the signal processing section 10. The recording section 13 and the synchronizing signal generator 14 together form a recording/controlling section for taking a still picture.

Further, the still camera body 9 is provided with a shutter driving controlling section 16, which operates the shutter 4 at a selectable speed when a shutter button 15 is depressed, a grip 17 and a view finder 18.

The recording/controlling section and the recording medium 11 should be suitable for recording still picture images, i.e., they should have a quantizer the quantization bit number of which is large enough to obtain an image of high quality and they should be able to process a large amount of data for a frame. They and may be those employed in a well known electronic still camera. For example, the apparatus disclosed in U.S. Pat. No. 4,131,919 can be used at the recording/controlling section and the recording medium 11. The recording medium 11 is typically in the form of a magnetic recording tape, though.

The motion picture camera body 19 (FIG. 2) is formed of first and second halves 19a and 19b connected with each other by means of a connecting cable. The second half 19b contains a recordng section 23 comprising a signal processing section 20 having an amplifier for amplifying the output signals from the image pickup-member 5 in the camera head 1 and a quantizer for quantizing the amplified signals, and a recording device 22 for recording the output signals from the signal processing section 20 on a recording medium 21. The first half 19a contains a synchronizing signal generator 24 which delivers a synchronizing signal both to the image pickup membr 5 and the signal processing section 20. The recording section 23 and the synchronizing signal generator 24 together form a recording/controlling section for taking a motion picture. In this particular embodiment of the present invention, the motion picture camera body 19 is divided into two halves and the recording section 23 and the synchronizing signal generator 24 are contained in the respective halves 19b and 19a. However, the camera body 19 may be a single piece containing both the recording section 23 and the synchronizing signal generator 24.

The motion picture camera body 19 is further provided with a shutter driving controlling section 26, which holds the shutter 4 open during depression of a shutter button 25, a grip 27 and a view finder 28.

The recording/controlling section and the recording medium 21 should be of a type suitable for recording motion picture images, i.e., the synchronizing signal generator 24 should be adapted to generate a synchronizing signal suitable for reading out the output signal from the image pickup member 5 at a high speed and the recording section 23 should include means for recording the image information picked up by the image pickup member 5 on the recording medium 21 in an interlaced fashion. Further, the recording/controlling section and the recording medium 21 should be able to process and store large amounts of data. They may be of a well known type such as is disclosed in U.S. Pat. No. 3,962,725. The recording medium 21 is typically in the form of a magnetic recording tape though it may be a magnetic recording disk or a magnetic recording drum.

In the electronic camera system of this embodiment, the camera head 1 is mounted on the still camera body 9 when a still picture is intended to be taken. Then, the image pickup member 5 in the camera head 1 and the recording/controlling section are actuated by connecting them to a power supply (not shown). When the shutter button 15 is depressed, the shutter 4 is opened under the control of the shutter driving controlling section 16 for a time interval manually set in advance or automatically set in accordance with the brightness of an object to be photographed, whereby an image of the object is formed on the image pickup member 5. The individual picture elements in the image pickup member 5 generate and store electric signals according to the intensity of light received thereby, and the stored electric signals are output under the control of the synchronizing signal generated by the synchronizing signal generator 14. The electric signals output from the image pickup member 5 are input into the signal processing section 10 and are subjected to electronic processing such as analogue-to-digital conversion. The processed signals are recorded on the recording medium 11 by means of the recording device 12. This recording is carried out with the recording medium 11 being moved a predetermined distance with respect to the recording head in the recording device 12 in synchronization with the depression of the shutter button 15. The image information thus recorded may be printed or may be displayed by a display device such as a cathode ray tube.

When a motion picture is intended to be taken, the camera head is mounted on the motion picture camera body 19. When the shutter button 25 on the motion picture camera body 19 is depressed, the shutter 4 is opened by way of the shutter driving controlling section 26 and an image of an object to be photographed is formed on the image pickup member 5. The individual picture elements in the image pickup member 5 generate and store electric signals according to the intensity of light received thereby, and the stored electric signals are read out in an interlaced fashion under the control of the synchronizing signal generated by the synchronizing signal generator 24. The reading-out is carried out in such a way that a pair of fields constitutes a frame having a cycle of thirty seconds in order to have the system conform to a television system. The read out signals are processed by the signal processing section 20 in the motion picture camera body 19 and subsequently recorded on the recording medium 21 by the recording device 22. During recording the recording medium 21 is moved with respect to the recording head in the recording device 22 while the shutter button 25 is depressed.

It is possible to provide the camera head with a shutter button, a grip and a view finder rather than separately providing them on each of the camera bodies 9 and 19.

The camera bodies 9 and 19 may be of a type for high speed recording without being limited to those described above.

I claim:

1. An electronic camera system, comprising: a camera head having a taking lens system for forming an image of an object to be shot, image pickup means for converting an optical image of said object into an electrical signal representing said object, shutter means, and first and second terminals mounted on said camera head and coupled to said image pickup means; a still picture camera body for taking still picture having a recording/controlling section adapted to be connected to the image pickup member to record output signals therefrom on a recording medium as a still picture, said still picture camera body having terminals mounted therein and coupled to said still picture recording/controlling section for mating with said camera head mounted terminals; and a motion picture camera body for taking a motion picture having a recording/controlling section adapted to be connected to the pickup member to record output signals therefrom on a recording medium as a motion picture, said motion picture camera body having terminals mounted therein and coupled to said motion picture recording/controlling section for mating with said camera head mounted terminals; said camera head being selectively removably mountable on the still picture camera body and the motion picture camera body such that the camera head mounted electrical terminals are in electrical contact with the corresponding terminals on the camera body to which the camera head is mounted.

2. An electronic camera as defined in claim 1, wherein said recording/controlling section in the still picture camera body includes a recording section, a signal processing section and a synchronizing signal generator, said signal processing section including a quantizer the quantization bit number of which is large enough to obtain an image of high quality, and being able to process a large amount of data for a frame, said synchronizing signal generator being adapted to deliver a synchronizing signal both to the signal processing section and the image pickup member in said camera head when the camera head is mounted on the still picture camera body.

3. An electronic camera system as defined in claim 2, wherein said still picture camera body includes a first electrical terminal for coupling with said first camera body mounted terminal to establish an electrical connection between the image pickup member in the camera head and the synchronizing signal generator in the camera body when the camera head is mounted thereon, and a second electrical terminal for coupling with said second camera head mounted terminal to establish an electrical connection between the image pickup member and the signal processing section when the camera head is mounted on the still picture camera body, the output signals from image pick member being read out through the second camera head and camera body terminals to the signal processing section under the control of the output of the synchronizing signal generator.

4. An electronic camera system as defined in claim 2 or claim 3, wherein said recording/controlling section in the motion picture camera body includes a recording section, a signal processing section and a synchronizing signal generator, said signal processing section including a quantizer the quantization bit number of which is smaller than that of the quantizer in the still picture camera body, said synchronizing signal generator being adapted to deliver a synchronizing signal both to the signal processing section and the image pickup member in said camera head when the camera head is mounted on the motion picture camera body.

5. An electronic camera system as defined in claim 4, wherein said motion picture camera body includes a third electrical terminal for coupling with said first camera head mounted terminal to establish an electrical connection between the image pickup member in the camera head and the synchronizing signal generator in the motion picture camera body when the camera head is mounted thereon, and a fourth electrical terminal for coupling with said second camera head mounted terminal to establish an electrical connection between the image pickup member and the signal processing section when the camera head is mounted on the motion picture camera body, the output signals from the image pickup member being read out through said second camera head and fourth camera body terminals to the signal processing section under the control of the output of the synchronizing signal generator.

6. An electronic camera system as defined in claim 5, wherein said recording/controlling section in the motion picture camera body includes means for reading out the output signals from the image pickup member in an interlaced fashion.

7. An electronic camera system as defined in claim 5, wherein said motion picture camera body comprises first and second halves disconnectably connected with each other by means of a cable, said synchronizing signal generator being in the first half while said recording section is in the second half, both terminals being on the first half and electrically connected to the recording section by way of the cable.

* * * * *